United States Patent

Peek, Jr.

[15] 3,698,579
[45] Oct. 17, 1972

[54] FRUIT HARVESTER

[72] Inventor: Ellis Peek, Jr., R.R. # 3, Shoals, Ind. 47581

[22] Filed: Sept. 28, 1970

[21] Appl. No.: 76,166

[52] U.S. Cl. ................214/83.1, 214/620, 56/329
[51] Int. Cl. .................................................B60p 1/00
[58] Field of Search ........56/329, 328; 214/149, 620, 214/83.1

[56] References Cited

UNITED STATES PATENTS

| | | | |
|---|---|---|---|
| 2,348,899 | 5/1944 | Guignard et al. | 214/149 X |
| 3,522,696 | 8/1970 | Millier et al. | 56/328 R |

Primary Examiner—Gerald M. Forlenza
Assistant Examiner—John Mannix
Attorney—Hood, Gust, Irish, Lundy & Coffey

[57] ABSTRACT

A fruit picker assembly comprising a frame, a box mounted on the frame, the box having a bottom, front and back walls, side walls, and at least a partially open top, means defining a walkway extending perimetrally about at least a portion of the box and movable therewith, and means for breaking the fall of fruit dropped into the box. The breaking means includes a plurality of straps extending transversely across the open top of the box with the spacing between adjacent straps being less than the diameter of the fruit to be picked and with the straps being flexible so that adjacent straps are separated by dropping the fruit thereon to permit the fruit to move therebetween into the box. I provide padded breaker panels or breaker walls disposed inside the box under the straps to guide the fruit falling through the straps toward the rear of the box. I also provide means for mounting the frame on a conventional front end loader of a farm tractor for pivotal movement about a generally horizontal axis, and motor means for selectively adjustably positioning the frame relative to such a front end loader and about the axis.

10 Claims, 6 Drawing Figures

PATENTED OCT 17 1972

INVENTOR
ELLIS PEEK, JR.

BY
*Hood, Gust, Irish, Lundy & Coffey*

ATTORNEYS

INVENTOR
ELLIS PEEK, JR.
BY
Hood, Gust, Irish Lundy & Coffey
ATTORNEYS

3,698,579

FRUIT HARVESTER

It is a primary object of my present invention to provide a fruit picker assembly which is simple in structure, economical to build, and yet effective for the purpose intended. My preferred structure is for use in combination with a conventional front end loader of a farm tractor. Particularly, my preferred structure is arranged to be pivotally connected to such a front end loader so that the entire structure can be lifted to the upper portions of fruit trees, such as apple, orange and peach trees, and selectively adjustably tilted for the convenience of the pickers standing on the structure as well as properly to orient the structure relative to the tree. The fruit is unloaded from the assembly by tilting it forwardly.

My structure comprises a frame, a box mounted on the frame, the box having a bottom, front and back walls, side walls, and at least a partially open top, means defining a walkway extending perimetrally about at least a portion of the box and movable therewith, and means for decelerating the falling fruit or for breaking the fall of the fruit dropped into the box. My preferred decelerating means or breaking means includes a plurality of straps extending transversely across the open top of the box with the spacing between adjacent straps being less than the diameter of the fruit to be picked. The straps are flexible so that adjacent straps are separated by dropping the fruit thereon to permit the fruit to move therebetween to enter the box. In my preferred structure, I provide means for adjusting the tautness of the straps.

Other objects and features of my present invention will become apparent as this description progresses.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
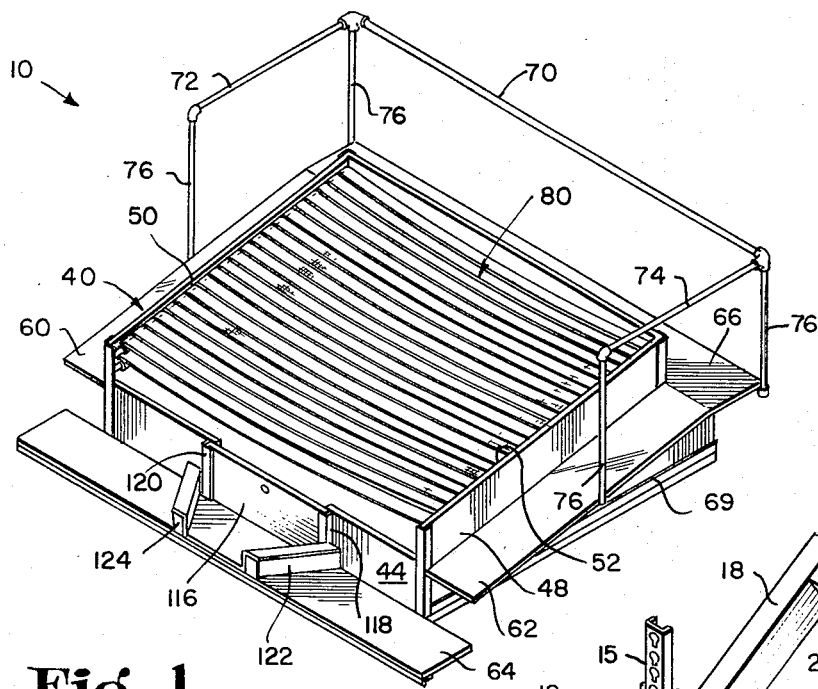
FIG. 1 is a perspective view of my fruit picker assembly.
Figure 2:
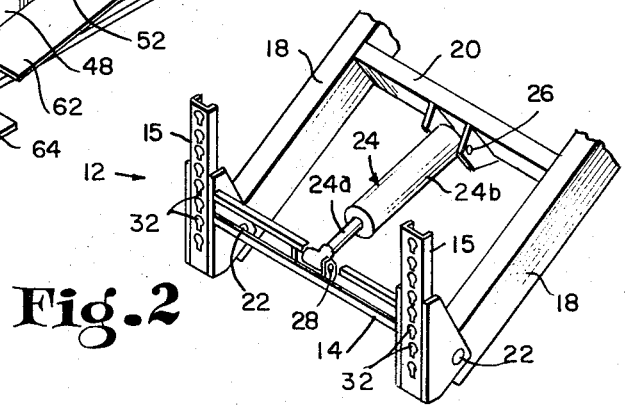
FIG. 2 is a fragmentary perspective view of a portion of a conventional front end loader of a farm tractor and the frame by which my picker assembly is mounted to the front end loader.

Referring now to the drawings, it will be seen that my fruit picker assembly, indicated generally at 10, combines a frame, indicated generally at 12, the frame including a frame portion 14 and a cooperating frame portion 16. The frame portion 14 includes a pair of laterally spaced apart, generally upwardly extending support brackets 15, the function of which will be further discussed hereinafter.

My assembly 10 is designed preferably to be supported on and carried by a conventional front end loader of a farm tractor (not shown). In the drawings, distal end portions of the forwardly extending support arms 18 of such a front end loader are illustrated. These support arms 18 are rigidly connected together by means of a cross brace member 20. The frame portion 14 is pivotally connected to the distal ends of the support arms 18 by pivot pins indicated at 22. Further, I provide fluid-operated motor means 24 for selectively tiltably positioning the frame portion 14 relative to the support arms 18, the illustrative fluid motor 24 including a piston rod 24a and a cooperating pressure cylinder 24b. The cylinder is pivotally connected to a cross brace 20 as indicated at 26 and the piston rod 24a is pivotally connected to the frame portion 14 as indicated at 28. It will be appreciated that, if the tractor itself is standing on reasonably level turf, the axis defined by the pivot pins 22 will be extending generally horizontally. Thus, the frame portion 14 is pivotal about a generally horizontal axis, the tilted position of the frame portion being determined by the extension of the piston rod 24a.

The brackets 15 are provided with a plurality of perforations 32 and the frame portion 16 is connected to the frame portion 14 by bolts 34 which extend through these perforations 32. I provide the plurality of spaced apart perforations 32 so that my assembly 10 can be used with a plurality of different types of conventional front end loaders.

My assembly 10 comprises a box 40 having a bottom 42, front wall 44, back wall 46, side walls 48, 50 and an open top, as indicated at 52. The opening 52 into the box 40, i.e., its open top, is bounded by the upper edges of the side walls 48, 50 and the upper edge of a wall 54 extending transversely across the box 40 approximately one foot forwardly of the back wall 46. The box 40 is rigidly mounted on the frame portion 16.

My fruit picker assembly 10 is constructed so that personnel can stand and walk thereon when the assembly is lifted to a proper position relative to a tree to pick its fruit. Thus, my assembly includes means providing a walkway extending perimetrally about at least a portion of the box 40. In the illustrative embodiment, I provide side walkways 60, 62, a front walkway 64, and a rear walkway 66. It will be appreciated that these walkways, each of which may be approximately one foot wide, can be provided by planks which are conventionally supported by angle brackets or the like. The back walkway 66 is supported, at its ends, by the side walls 48, 50 and along its rear edge by the back wall 46. The front walkway 64 may be, for instance, merely an extension of the bottom 42.

The box 40 and the walkways 60, 62, 64, 66 may be fabricated from wood and plywood primarily with metal angle irons and brackets as required for structural purposes. For instance, I show a pair of angle irons 68 supporting the center portion of the bottom 42 as well as an angle iron 69 along each edge of the bottom.

In order to keep the personnel from falling off the assembly 10 and onto the front end loader or the tractor, I provide hand rails 70, 72, 74 extending about a portion of the path provided, respectively, by the walkways 60, 62, 66. These hand rails, which may be conventional steel or aluminum pipe, are shown supported on vertically extending stanchions or pipes 76. It will be seen that the rails 72, 74 extend forwardly only about one half the depth of the box 40. The hand rails terminate at this point because my assembly is such that its forward portion can be pushed into the body of a tree so that limbs of the tree will be extending outwardly over the box 40, the opening 52 of which may be approximately 5 feet by 8 feet. Then, the pickers who are standing on the walkways protected by the hand rails can simply shake the limbs, in some cases, to cause the fruit to drop into the box 40. If the fruit cannot be picked by shaking the limbs, each piece of fruit can be hand picked and then dropped into the box.

The front walkway 64 and the back walkway 66 are, in the illustrative embodiment, generally parallel to the bottom 42 while the side walkways 60, 62 are generally parallel to the plane defined by the upper edges of the side walls 48, 50 and the wall 54. When the assembly 10 is in its picking position illustrated in FIG. 3, the side walkways 60, 62 extend generally horizontally while the front walkway 64 and back walkway 66, both of which are generally parallel to the bottom 42, tilt rearwardly. The front walkway 64 tilts rearwardly when the assembly is in the picking position so that a person standing thereon will tend to fall rearwardly if he tends to lose his footing and starts to fall. Similarly, the back walkway 66 tilts rearwardly, in the picking position, to tend to lean the pickers against the hand rail 70. Generally, however, when the assembly 10 is in its picking position with the forward portion thereof thrust into the body of a tree, pickers will not be standing on the front walkway 64, and will, in fact, be standing primarily on the walkways bounded by the hand rails 70, 72, 74.

Figure 4:
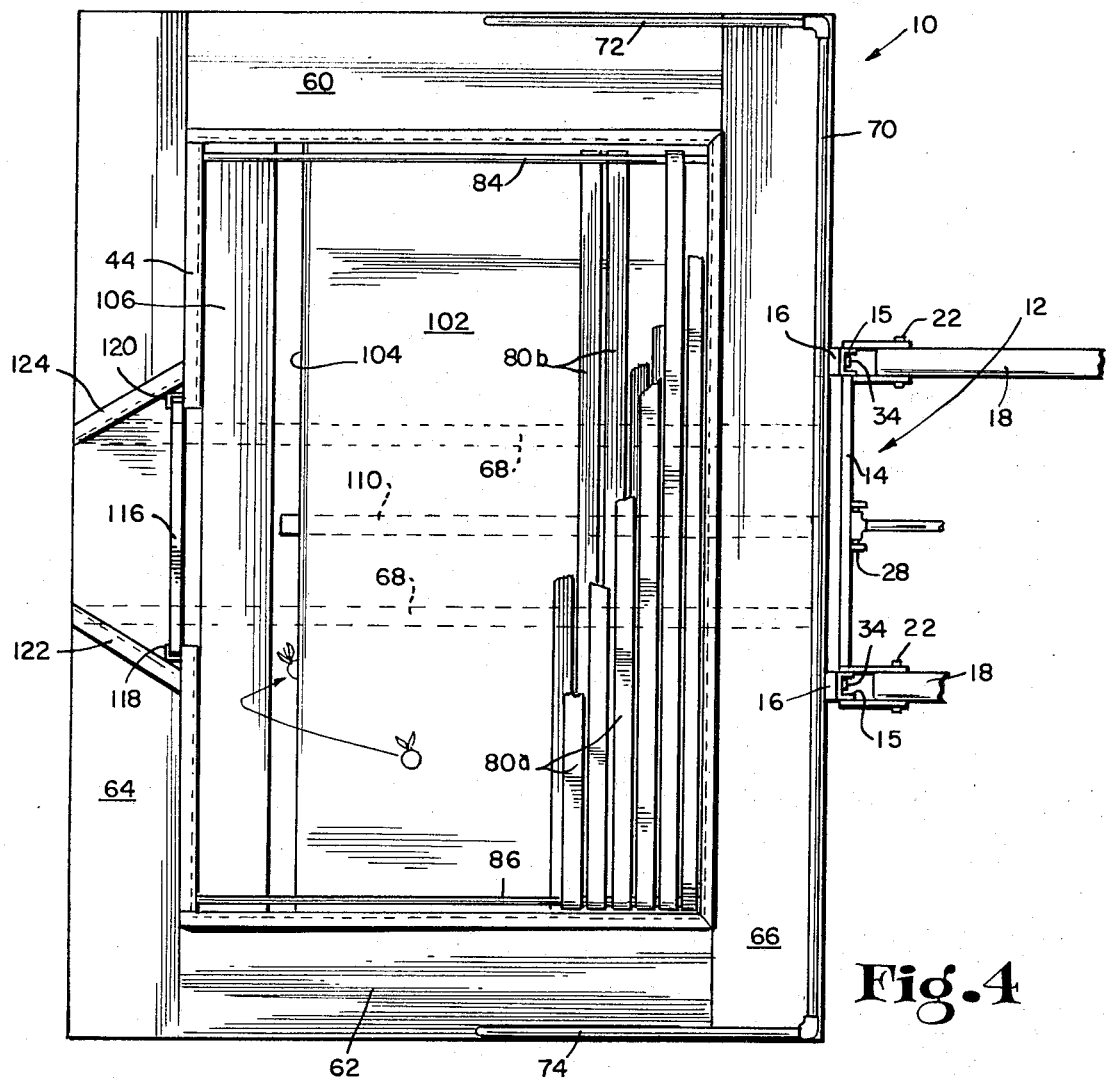
FIG. 4 is an enlarged plan view of my fruit picker assembly with some of the straps removed to show my inclined padded panels or walls for directing the fruit inside the box.
Figures 5, 6:
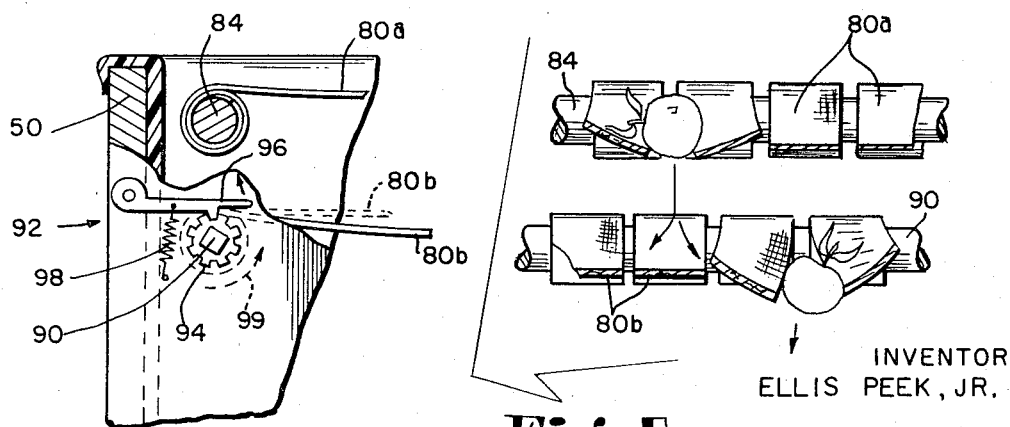
FIG. 5 is a fragmentary sectional view, enlarged, to show how apples move through the offset straps.
FIG. 6 is a fragmentary sectional view showing an illustrative means for selectively adjustably establishing the tautness of the straps.

Of course, some means must be provided for decelerating the falling fruit. If the fall of the fruit is not broken, the fruit will be bruised and, consequently, ruined. My means for breaking the fall of the fruit includes a plurality of straps 80 extending across the open top of the box 40 with the spacing between adjacent straps being less than the diameter of the fruit to be picked, the straps being flexible so that adjacent straps are separated by dropping the fruit thereon to permit the fruit to move between the straps to enter the box. The straps may be fabricated from any conventional strapping material, such as canvas, plastic or the like. In the illustrative embodiment, the straps extend transversely across the open top in a direction generally parallel to the axis defined by the pivot pins 22, i.e., the pivot axis for the assembly 10. I prefer that the said plurality of straps 80 provide an upper layer of straps 80a and a lower layer of straps 80b positioned and arranged so that each piece of falling fruit separates and moves between an adjacent pair of straps 80a in the upper layer and then between an adjacent pair of straps 80b in the lower layer. I also prefer that the straps 80b in the lower layer be offset relative to the straps 80a in the upper layer so that each strap in the lower layer is in registry with the spacing between an adjacent pair of straps in the upper layer. This feature is best seen in FIGS. 4 and 5 of the drawings. In FIG. 5, I show an apple moving between a pair of straps 80a and then another apple moving between a pair of straps 80b. It will be appreciated that the fruit will not be bruised by the straps because the straps are readily flexible and serve the function of slowing down the fruit without bruising it.

In the illustrative embodiment, the upper straps 80a extend between a pair of rods 84, 86 extending, respectively, along the upper edges of the side walls 48, 50 while the lower straps 80b extend between a similar pair of rods 90 disposed, respectively, below the rods 84, 86. The ends of the straps 80a, 80b may be wrapped about the rods as illustrated, for instance, in FIGS. 5 and 6. Further, my preferred assembly 10 includes means for selectively adjusting the tautness of the straps 80a, 80b. One such means, indicated generally at 92, is shown in FIG. 6 where the rod 90 is mounted for rotation about its axis with a cogwheel 94 firmly attached thereto and a pawl 96 for engaging the cogwheel. The pawl 96 is urged by a spring into engagement with the cogwheel. Thus, the pawl 96 can be lifted and the rod 90 can be rotated as indicated by the arrow 99 to tighten or loosen the straps 80b connected to the rod. The tautness adjustment is provided to accommodate the different types and sizes of fruit to be picked.

Instead of adjusting the rod to which all of the straps in a layer are connected, I may just as well adjust each strap individually.

Figure 3:
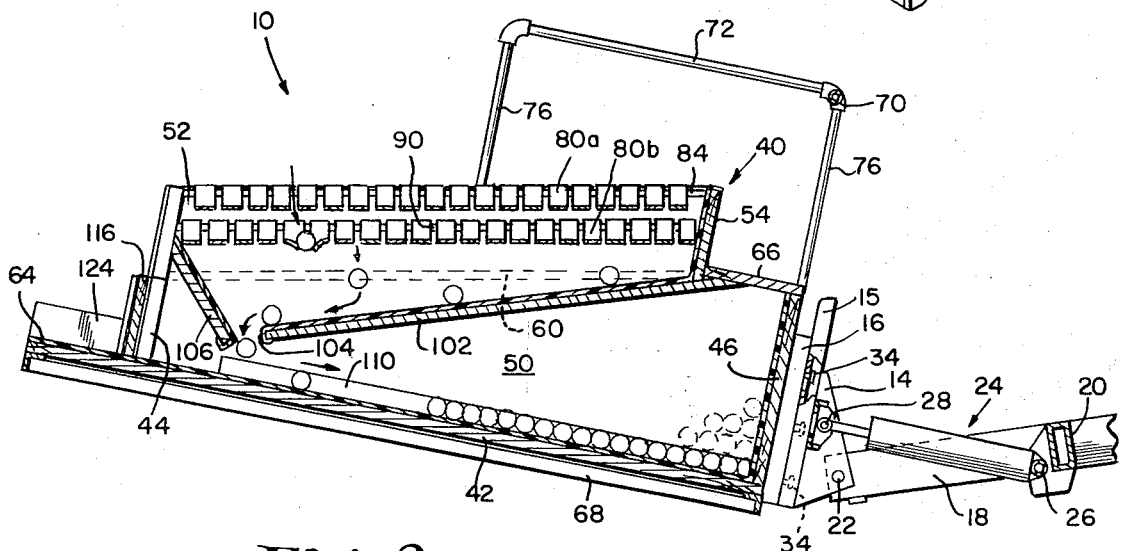
FIG. 3 is a sectional view of my fruit picker assembly.

Referring particularly to FIGS. 3 and 4, it will be seen that the illustrative apparatus 10 includes a first wall 102 disposed in the box 40 beneath a portion of the straps 80 and a second wall 106 disposed in the box beneath the balance of the straps 80, the first wall 102 inclining forwardly and downwardly as illustrated to terminate with a transversely extending edge 104 intermediate the front and back of the box, and the second wall 106 inclining rearwardly and downwardly to provide an inclined surface spaced forwardly of the edge 104 by a distance slightly greater than the diameter of the fruit to be picked. Thus, the fruit falling against the first wall 102 will roll to its edge 104 and against the second wall 106 to be directed toward the rear of the box 40. When the assembly 10 is in its picking position, of course, the fruit rolls on the bottom 42 toward the rear. I have found that the assembly 10 structure having the proportions illustrated is such that the fruit will tend to roll toward the rear of the box 40 to cover the bottom 42 in a single layer before any fruit tends to ride up onto the single layer to form additional layers.

In order to keep the fruit from rolling from side to side on the bottom 42, I provide a divider 110 best seen in FIGS. 3 and 4 which extends from the rear of the box toward the front near its center. This divider 110 serves to prevent undue lateral rolling of the fruit if the tractor is not on level terrain.

The box 40 is unloaded, in the illustrative embodiment, by opening a door 116 at the front of the box 40 and then tilting the box gently forwardly and downwardly to cause the fruit to roll out an opening in the front wall 44 covered by the door 116. The door 116 is guided for sliding movement by angle iron-type brackets 118, 120. Padded guides 122, 124 are provided on the front walkway 64 to guide the fruit leaving the box 40.

I prefer that all surfaces of the assembly 10 on which the fruit rests or against which the fruit moves be padded. For instance, the walls 102, 106, 44, 46, 48, 50 and the bottom 42 are preferably padded as illustrated. As best seen in FIG. 6, even the upper edges of the walls are preferably padded. The padding of fruit handling equipment is conventional, and no claim is made to that concept in this invention. The padding can be provided in a number of different ways, but I prefer to provide it by placing foam rubber sheets down against the solid surface with a plastic sheet of material over the foam rubber.

Referring again to FIG. 3, it will be seen that the picking position of the assembly 10 is such that, when the two layers of straps 80a, 80b lie in generally horizontally extending planes, the bottom 42 inclines rearwardly and downwardly to cause the fruit to roll to the rear of the box. That is, the planes defined by the two layers of straps 80a, 80b, at least when the straps are taut, incline forwardly and downwardly relative to the bottom 42. It will be appreciated, however, that the straps, unless they are extremely taut, will not lie in a flat plane. However, they will tend to define a plane for reference purposes in this description and in the claims appended hereto.

What is claimed is:

1. A fruit picker assembly comprising a frame, a box mounted on said frame, said box having a bottom, front and back walls, side walls and at least a partially open top, means defining a walkway extending perimetrally about at least a portion of said box and movable therewith, means for breaking the fall of fruit dropped into said box, said breaking means including a plurality of straps extending across the open top of said box with the spacing between adjacent straps being less than the diameter of the fruit to be picked, said straps being flexible so that adjacent straps are separated by dropping the fruit thereon to permit the fruit to move therebetween to enter the box, means for mounting said frame on a conventional front end loader of a farm tractor for pivotal movement about a generally horizontal axis, and motor means for selectively adjustably positioning said frame relative to such a front end loader and about said axis.

2. The invention of claim 1 in which said plurality of straps includes an upper layer of straps and a lower layer of straps positioned and arranged so that each piece of falling fruit separates and moves between an adjacent pair of straps in the upper layer and then between an adjacent pair of straps in the lower layer, said generally horizontal axis being adjacent the rear of said box, and in which said straps extend transversely across said open top, at least the end portions of said straps in said upper layer lying generally in a plane inclined forwardly and downwardly relative to said bottom so that, when said plane is disposed generally horizontally, said bottom is tilted rearwardly and downwardly to roll the fruit thereon toward the rear of said box.

3. The invention of claim 2 including a first wall disposed in said box beneath a portion of said straps and a second wall disposed in said box beneath the balance of said straps, said first wall inclining forwardly and downwardly to terminate with a transversely extending edge intermediate the front and back of said box, and said second wall inclining rearwardly and downwardly to provide an inclined surface spaced forwardly of said edge by a distance slightly greater than the diameter of the fruit to be picked, whereby the fruit falling against said first wall will roll to its said edge and against said second wall to be directed toward the rear of said box.

4. The invention of claim 1 including a first wall disposed in said box beneath a portion of said straps and a second wall disposed in said box beneath the balance of said straps, said first wall inclining forwardly and downwardly to terminate with a transversely extending edge intermediate the front and back of said box, and said second wall inclining rearwardly and downwardly to provide an inclined surface spaced forwardly of said edge by a distance slightly greater than the diameter of the fruit to be picked, whereby the fruit falling against said first wall will roll to its said edge and against said second wall to be directed toward the rear of said box.

5. The invention of claim 1, including a first wall disposed in said box beneath a portion of said straps and a second wall disposed in said box beneath the balance of said straps, said first wall inclining forwardly and downwardly to terminate with a transversely extending edge intermediate the front and back of said box, and said second wall inclining rearwardly and downwardly to provide an inclined surface spaced forwardly of said edge by a distance slightly greater than the diameter of the fruit to be picked, whereby the fruit falling against said first wall will roll to its said edge and against said second wall to be directed toward the rear of said box.

6. The invention of claim 1 in which said straps extend transversely across said open top to lie, when said straps are taut, generally in a plane inclined forwardly and downwardly relative to said bottom, and said generally horizontal axis being disposed adjacent the rear of said box, whereby when the plane in which said straps lie is disposed generally horizontally, said bottom is tilted rearwardly to roll the fruit falling thereon to the rear of said box.

7. The invention of claim 6 including a first wall disposed in said box beneath a portion of said straps and a second wall disposed in said box beneath the balance of said straps, said first wall inclining forwardly and downwardly to terminate with a transversely extending edge intermediate the front and back of said box, and said second wall inclining rearwardly and downwardly to provide an inclined surface spaced forwardly of said edge by a distance slightly greater than the diameter of the fruit to be picked, whereby the fruit falling against said first wall will roll to its said edge and against said second wall to be directed toward the rear of said box.

8. The invention of claim 6 including means for selectively adjusting the tautness of said straps.

9. The invention of claim 1 including means for selectively adjusting the tautness of said straps.

10. The invention of claim 9 including a journal mounted shaft extending along a side edge of said open top, adjacent ends of said straps being connected to said shaft, and in which said adjusting means includes means for rockably positioning said shaft about its axis.

* * * * *